(12) United States Patent
Applegate et al.

(10) Patent No.: US 7,958,075 B1
(45) Date of Patent: Jun. 7, 2011

(54) COMPRESSING RECTILINEAR PICTURES AND MINIMIZING ACCESS CONTROL LISTS

(75) Inventors: David L. Applegate, Maplewood, NJ (US); Gruia Calinescu, Wilmette, IL (US); David S. Johnson, Madison, NJ (US); Howard Karloff, New York, NY (US); Katrina Ligett, Pittsburgh, PA (US); Jia Wang, Randolph, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1013 days.

(21) Appl. No.: 11/824,073

(22) Filed: Jun. 28, 2007

Related U.S. Application Data

(60) Provisional application No. 60/817,437, filed on Jun. 29, 2006.

(51) Int. Cl.
*G06F 17/00* (2006.01)
*G06N 5/02* (2006.01)

(52) U.S. Cl. .......................................................... 706/47
(58) Field of Classification Search ...................... 706/47
See application file for complete search history.

(56) References Cited

U.S. PATENT DOCUMENTS

| | | | | |
|---|---|---|---|---|
| 5,881,243 | A * | 3/1999 | Zaumen et al. | 709/241 |
| 6,411,946 | B1 * | 6/2002 | Chaudhuri | 706/21 |
| 6,952,779 | B1 * | 10/2005 | Cohen et al. | 726/22 |
| 7,159,035 | B2 * | 1/2007 | Garcia-Luna-Aceves et al. | 709/241 |
| 7,191,140 | B2 * | 3/2007 | Yu et al. | 705/7 |
| 7,624,337 | B2 * | 11/2009 | Sull et al. | 715/201 |
| 7,698,463 | B2 * | 4/2010 | Ogier et al. | 709/242 |
| 7,823,055 | B2 * | 10/2010 | Sull et al. | 715/201 |

OTHER PUBLICATIONS

Access-Control Policies via Belnap Logic: Effective and Efficient Composition and Analysis, Bruns, Glenn; Huth, Michael; Computer Security Foundations Symposium, 2008. CSF '08. IEEE 21$^{st}$ Digital Object Identifier: 10.1109/CSF.2008.10 Publication Year: 2008 , pp. 163-176.*
An Adaptive Multi-Channel MAC Protocol with Dynamic Interval Division in Vehicular Environment, Liang Liu; Weiwei Xia; Lianfeng Shen; Information Science and Engineering (ICISE), 2009 1st International Conference on Digital Object Identifier: 10.1109/ICISE. 2009.226 Publication Year: 2009 , pp. 2534-2537.*
Building an Interactive Next-Generation Artist Recommender Based on Automatically Derived High-Level Concepts, Pohle, T.; Knees, P.; Schedl, M.; Widmer, G.; Content-Based Multimedia Indexing, 2007. CBMI '07. International Workshop on Digital Object Identifier: 10.1109/CBMI.2007.385431 Publication Year: 2007 , pp. 336-343.*
Extracting meaningful semantic information with EMATISE: an HPSG-based Internet search engine parser, Lijun Hou; Cercone, N.; Systems, Man, and Cybernetics, 2001 IEEE International Conference on vol. 5 Digital Object Identifier: 10.1109/ICSMC.2001. 971943 Publication Year: 2001 , pp. 2858-2866 vol. 5.*

* cited by examiner

*Primary Examiner* — Michael Holmes

(57) ABSTRACT

A geometric model is considered for the problem of minimizing access control lists (ACLs) in network routers. A colored rectilinear pattern is created within an initially white rectangular canvas, and the basic operation is to choose a subrectangle and paint it a single color, overwriting all previous colors in the rectangle. The method operates on rectangular rule lists (RRLs) and access control lists (ACLs) in which all rectangles are strips that extend either the full length or the full height of the canvas. A polynomial-time algorithm optimally constructs such patterns when, as in the ACL application, the only colors are black and white (permit or deny). That algorithm is complemented by a significantly faster approximation algorithm that is guaranteed to be no worse than 3/2 optimal.

24 Claims, 2 Drawing Sheets

101

102

103

101   102   103

200

300

COMPRESSING RECTILINEAR PICTURES AND MINIMIZING ACCESS CONTROL LISTS

This application claims the benefit of provisional patent application Ser. No. 60/817,437, filed on Jun. 29, 2006.

FIELD OF THE INVENTION

The present invention relates generally to the problem of minimizing a set of rules necessary to produce a rectilinear pattern in a grid. The invention is applied to the task of minimizing a list of access control rules such as those used in network router line cards to determine which arriving packets should be forwarded to their destination and which should be dropped.

BACKGROUND OF THE INVENTION

Many of today's software packages that generate graphics, such as Xfig and Powerpoint, share a common method for creating rectilinear patterns. Starting with a white rectangular canvas, the user repeatedly applies a "rectangle tool" with which one sweeps out a rectangular area and colors the interior with a specified color, overwriting any previous contents of that area.

For example, the final pattern of FIG. 1 is created by applying a sequence of three rectangle operations 101, 102, 103 to an underlying canvas that is a 4×4 grid. The sequence depicted in the figure is not particularly efficient since two operations would have sufficed.

Given the manual work involved in producing such figures, it is natural to want to determine efficient plans of action in advance. Let a pair (R, c), where R is a rectangle and c is a color, be called a rectangle rule, and a sequence of such rules $(R_1, c_1), (R_2, c_2), \ldots, (R_n; c_n)$ be called a rectangle rule list or RRL. For an RRL $\mathfrak{R}$, let P$\mathfrak{R}$ denote that pattern it produces. Given a target pattern P, the goal is to find a minimum-length RRL $\mathfrak{R}$ such that P$\mathfrak{R}$=P. Not only can finding such an RRL save labor, it also provides a scheme for picture compression that is potentially more effective than the classic scheme in which a black rectilinear figure is represented by a collection of black rectangles that covers it. Moreover, a restricted version of the problem has an important application to Internet management, and specifically to access control lists.

Access control lists (ACLs) are used in network router line cards to determine which arriving packets should be forwarded to their destination and which should be dropped. For instance, an Internet Service Provider (ISP) might want its access routers only to forward packets that came from or are destined to customers who have officially been assigned to that router. ACLs can also be used to implement firewalls and to provide a range of levels of quality of service.

An ACL is made up of a sequence of rules. In an extended ACL, a rule can be viewed as having five components:

| Source Range | Protocol | Destination Range | Port(s) | Action |
| --- | --- | --- | --- | --- |

The source and destination ranges are specified by binary strings s of length w or less (where w is the length of an IP address, currently 32 but expanding to 64 in IPV6). The string s matches all IP addresses that have it as a prefix; an empty string matches everything. Possible protocols include IP, TCP, UDP, and ICMP, with IP matching all protocols and the others matching only packets labeled by that particular protocol. Ports can either be an individual port number, a range of such numbers, or "any," which matches everything. The action can either be permit, which allows the packet through, or deny, which causes the packet to be dropped. A basic ACL omits the protocol and port fields.

An ACL operates as follows: When a packet arrives, the router determines the first rule in the list that it matches and performs the action specified by that rule. If there is no match, the packet is dropped. In high-speed routers the classification is performed by special hardware called "ternary CAMs" (TCAMs) that evaluate all the rules in parallel and output the lowest indexed match. TCAMs are expensive and impose limits on the size of ACLs, as do the overall memory constraints in a line card. Thus, a natural optimization criterion for ACLs is to minimize their length while preserving the results of their actions. Note that this will also reduce the maximum delay in routers that evaluate rules sequentially.

Other optimization criteria have also been studied. Data structures and algorithms have been studied for quickly determining which rule in an ACL is the first match or, when information about the data traffic is known in advance, trying to minimize the average time to find the applicable rule, either simply by reordering the ACL or by devising sophisticated decision tree classifiers. None of those approaches, however, have yet been implemented in real-world routers. Although such approaches can be of value when using software simulation to study router behavior, for now ACL minimization remains the most direct way to improve the access control performance of current real-world routers.

In modeling the ACL minimization problem, matters can be simplified by ignoring the protocol and port restrictions. Those fields are not present in the simpler basic ACLs that are still sometimes used, and even within extended ACLs, most rules (approximately 85% or more) are basic in that the entries for protocol and port match everything. The more restrictive rules, even when present, are likely to have priority over the basic ones or be independent of them, so that optimizing over the basic rules would at least be a component of an effective heuristic for the general problem. Thus in what follows it is assumed that the ACLs are restricted to basic rules.

The problem of ACL minimization can usefully be modeled in geometric terms. Consider a $2^w \times 2^w$ grid with a cell for each combination of a source and destination IP address (columns and rows indexed from 0 to $2^w-1$). The action of an ACL can be viewed as coloring the cells of that grid, with the cell colored white if packets with that combination are denied, and black if they are permitted. Note that each rule applies to a rectangle in our grid whose x-coordinates include the IP addresses in the source range for the rule and whose y-coordinates include those in the destination range. Thus each rule in an ACL is once again a pair (R, c), where R is a rectangle and c is a color, just as in the RRL application.

There are two distinctions between ACLs and RRLs, one minor and one major. The minor distinction is that the rules in an ACL are in the reverse order from those in an RRL, with the final color of a grid cell depending on the first rectangle in the ACL that contains it, rather than the last, as was the case with RRLs. The pattern corresponding to an ACL is thus determined by reversing the order of its rules, and then treating that reversed list as an RRL.

The second and more meaningful distinction is that the set of possible rectangles is highly constrained in ACLs since their x- and y-coordinates are determined by IP address prefixes. The widths and heights of rectangles must all be of the form $2^k$ for $0 \leq k \leq w$, and if a rectangle's width (height) is $2^k$, then it must start in a column (row) whose coordinate is congruent to 0 mod $2^k$. Note that this means that the projections of the rectangles on the axes are laminar in that for any two rectangles the projections are either disjoint or one is contained in the other. As will be seen, that property can make an algorithmic difference.

Several special cases of ACL minimization have previously been studied. One such case is the one dimensional case where only the destination (or source) is restricted. This corresponds to the problem of minimizing routing tables, where under most routing protocols, the link out which a packet is sent depends only on its destination address. The rules in that case correspond simply to intervals, rather than rectangles. It is not difficult to see that the one-dimensional ACL problem can be solved in polynomial time by dynamic programming. That holds even when multiple colors are allowed, as might be the case, for instance, when one wants to specify different levels of service quality. For a K-colored pattern on a $2^w \times 2^w$ grid specified by an ACL of length n, one known algorithm produces an optimal equivalent ACL in time $O(Knw)$.

The case of one-dimensional RRL minimization has been solved in polynomial time by dynamic programming. For the basic two-color case it is trivial—simply using a separate interval for each maximal black region is optimal. With more than two colors the RRL problem appears to be more difficult than the ACL problem. The best running time bound known to have been achieved is $O(Kn^3)$, with the dynamic program exploiting the observation that even though arbitrary interval rules are allowed, it may be assumed without loss of generality that the intervals used in any specific RRL are themselves laminar.

Another restriction on rules that has been studied is the case where only black rectangle rules are allowed. The problem of finding the minimal set of such rules needed to create a given pattern has been called rectilinear picture compression and has long been known to be NP-hard.

The above hardness and approximation results refer to the RRL problem. For the ACL problem, it has been shown that the optimal all-black ACL for an arbitrary pattern (holes allowed) can be found in polynomial time. A key lemma in that case is that, when the projections of the allowed rectangles on both axes are laminar, there is a unique non-redundant cover of the black cells of the pattern by maximal black rectangles.

Unfortunately, finding the optimal all-black RRL/ACL doesn't necessarily help much to solve the present problem. Examples such as the grid 200 of FIG. 2, showing a pattern with a linear factor performance penalty for restricting to "all-black" rules, suffice to show that this restriction can cause the best ACL or RRL to increase by a factor of $\Theta(OPT(P))$. In the general $(2n+1) \times (2n+1)$ version of that example the cells with both coordinates odd are black and the rest of the pattern is white. The optimal RRL/ACL includes one black rule covering the whole pattern, overwritten by n white column rules and n white row rules, for a total of 2n+1 rules, whereas the best all-black-rule list contains $(n+1)^2$ rules. Moreover, there doesn't seem to be any analog of the key lemma above to handle the case of both black and white rules. The inventors have proven that RRL minimization is NP-hard and have conjectured that the same is true for ACL minimization.

That motivates the search for more realistic special cases to consider, and that approach is taken in what follows.

There therefore remains a need for a technique for optimizing a set of rules for creating a rectilinear pattern in a grid, and specifically for minimizing the number of rules in an RRL or ACL.

SUMMARY OF THE INVENTION

The present invention addresses the needs described in a method for computing a minimum-length strip-rule access control list for a given input strip-rule pattern. The method includes the steps of computing a minimum cost series of states to generate the input strip-rule pattern using a shortest-path algorithm, the algorithm repeatedly calculating successor states of a given state, and their costs, and discarding more expensive duplicate states if discovered; and determining the minimum-length strip-rule access control list from the series of states.

The step of determining the minimum-length strip-rule access control list may include reversing the series of states. The shortest-path algorithm may maintain a priority queue of calculated states, and the successor states may be successor states of a lowest-cost state in the priority queue. A cost of a state may be calculated from the number of access control list moves required to reach the state from a predecessor state plus a cost of the predecessor state.

The shortest path algorithm may comprise the steps of (a) initializing a priority queue with a state representing the input strip-rule pattern; (b) in the priority queue, replacing a state of lowest cost with two new states, each of the two new states being reached by a series of moves optimally consuming one of two equivalence classes containing equivalent rows or columns, while also consuming as much as possible of the other of the two equivalence classes; (c) for each of the new states, calculating a cost as a cost of a predecessor state of the new state plus a number of moves of step (b); (d) if an instance of a reached state is already in the priority queue, maintaining only the lower cost instance of the state in the queue; (e) repeating steps (b), (c) and (d) on a lowest-cost, non-final state in the priority queue until a final state is first discovered; and (f) from the first final state reached, reversing the order of the replacing steps to determine the minimum-length access control list.

Each state in the priority queue may be a five-tuple comprising (a) an identity E1 of a newer one of the equivalence classes; (b) a color c1 of the two colors contained in cells of equivalence class E1; (c) an identity E2 of the older one of the equivalence classes; (d) a color c2 of the two colors contained in at least one cell of equivalence class E2; and (e) a subset U of lines of E2 containing in cells of color c2.

The step of replacing the state with two new states, each of the two new states being reached by a series of moves optimally consuming one of two equivalence classes containing equivalent rows or columns, while also consuming as much as possible of the other of the two equivalence classes, may further comprise the step of, for each contiguous set of strips defined by a shortest possible common binary prefix of binary representations of locations of the strips, each strip in the contiguous set containing only one of two colors, determining a minimum-length series of steps to cover all uncovered cells of one of the two colors, each step comprising covering one or more contiguous strips of cells containing uncovered cells of only a single color.

The shortest-path algorithm may include the steps of (a) initializing a priority queue with a five-tuple representing the input strip rule pattern, wherein elements of the five-tuple define two active equivalence classes of strips in the input pattern, each one of the active equivalence classes containing one or more strips of cells, each one of the two active equivalence classes containing only strips having cells arranged in a same color pattern in the input pattern as other strips in the equivalence class and containing cells of only one of two colors of the input pattern; and (b) for each of two active equivalence classes, perform the following: (i) determining a minimum-length series of steps to cover all uncovered cells of the active equivalence class, each step comprising covering one or more contiguous strips of cells containing uncovered cells of only a single color; (ii) determining a cost associated with a state resulting from the series of steps, the cost being a number of moves to reach the resulting state from a predecessor state plus the cost of that predecessor state, and, if the resulting state is non-final, (iii) defining a new five-tuple representing the resulting state; (iv) adding the new five-tuple, together with the resulting cost, to the priority queue; and (v) eliminating duplicate states in the priority queue by retaining only that instance of the state having a lower cost. (c) step (b) is then repeated on a lowest-cost non-final state in the priority queue, until a final state is first reached; and (d) when a final state is reached, the access control list is constructed by reversing an order of the stored steps of the state.

The priority queue may additionally contain, for each state of the grid, a definition of a predecessor state in association with each state. The priority queue may additionally contain, for each state of the grid, a series of steps to create the state from its predecessor state.

If the minimum-length series of steps that covers all uncovered cells of one active equivalence class also covers all uncovered cells of the other active equivalence class, step (b) may not be repeated for the other active equivalence class.

The step determining a minimum-length series of steps to cover all uncovered cells of the active equivalence class may further comprise the step of, for each contiguous set of strips defined by a shortest possible common binary prefix of binary representations of locations of the strips, each strip in the contiguous set containing only one of the two colors, determining a minimum-length series of steps to cover all uncovered cells of one of the two colors, each step comprising covering one or more contiguous strips of cells containing uncovered cells of only a single color.

That five-tuple may comprise (a) an identity E1 of a newer one of the equivalence classes; (b) a color c1 of the two colors contained in cells of equivalence class E1; (c) an identity E2 of an older one of the equivalence classes; (d) a color c2 of the two colors contained in cells of equivalence class E2; and (e) a subset U of lines of E2 containing at least one cell of color c2.

Another embodiment of the invention is method for computing a minimum-length strip-rule rectangle rule list for a given input strip-rule pattern. That method comprises the steps of computing a minimum cost series of states to generate the input strip-rule pattern using a shortest-path algorithm, the algorithm repeatedly calculating successor states of a given state, and their costs, and discarding more expensive duplicate states if discovered; and determining the minimum-length strip-rule rectangle rule list from the series of states.

The shortest-path algorithm may maintain a priority queue of calculated states, and the successor states are successor states of a lowest-cost state in the priority queue. A cost of a state may be calculated as a cost of its predecessor state plus a number of moves needed to get to the state from the predecessor state.

The shortest path algorithm may comprise the steps of: (a) initializing a priority queue with a state representing the input strip-rule pattern; (b) in the priority queue, replacing the state with two new states, each of the two new states being reached by a series of moves optimally consuming one of two equivalence classes containing equivalent rows or columns, while also consuming as much as possible of the other of the two equivalence classes; (c) for each of the new states, calculating a cost as a cost of a predecessor state of the new state plus a number of moves of step (b); (d) if an instance of a reached state is already in the priority queue, maintaining only the lower cost instance of the state in the queue; and (e) repeating steps (b), (c) and (d) on a lowest-cost, non-final state in the priority queue until a final state is first reached.

In that case, the priority queue may be a five-tuple comprising: (a) an identity E1 of a newer one of the equivalence classes; (b) a color c1 contained in cells of equivalence class E1; (c) an identity E2 of the older one of the equivalence classes; (d) a color c2 contained in cells of equivalence class E2; and (e) a subset U of lines of E2 containing at least one cell of color c2.

The shortest-path algorithm may comprise the steps of (a) initializing a priority queue with a five-tuple representing the input strip rule pattern, wherein elements of the five-tuple define two active equivalence classes of strips in the input pattern, each one of the active equivalence classes containing one or more strips of cells, each one of the two active equivalence classes containing only strips having cells arranged in the same color pattern in the input pattern as other strips in the equivalence class and containing cells of only one of two colors of the input pattern; (b) for each of two active equivalence classes, perform the following: (i) determining a minimum-length series of steps to cover all uncovered cells of the active equivalence class and covering as many lines of the other equivalence class as possible, each step comprising covering one or more contiguous strips of cells containing uncovered cells of only a single color; (ii) determining a cost associated with a state resulting from the series of steps, the cost being a number of moves to reach the resulting state from a predecessor state plus the cost of that predecessor state, and, if the resulting state is non-final; (iii) defining a new five-tuple representing the resulting state; (iv) adding the new five-tuple, together with the resulting cost, to the priority queue; and (v) eliminating duplicate states in the priority queue by retaining only that instance of the state having a lower cost. Step (b) is then repeated on a lowest-cost non-final state in the priority queue, until a final state is first reached.

The priority queue may additionally contain, for each state of the grid, a definition of a predecessor state in association with each state. The priority queue may additionally contain, for each state of the grid, a series of steps to create the state from its predecessor state. If the minimum-length series of steps that covers all uncovered cells of one active equivalence class also covers all uncovered cells of the other active equivalence class, step (b) may not be repeated for the other active equivalence class.

The step determining a minimum-length series of steps to cover all uncovered cells of the active equivalence class may further comprise the steps of: (a) creating one step to cover each embedded block of lines; and (b) creating one step to cover each enclosing block of lines.

The five-tuple in this case may comprise (a) an identity E1 of a newer one of the equivalence classes; (b) a color c1 of the two colors contained in cells of equivalence class E1; (c) an identity E2 of an older one of the equivalence classes; (d) a color c2 of the two colors contained in cells of equivalence class E2; and (e) a subset U of lines of E2 containing at least one cell of color c2.

DESCRIPTION OF THE INVENTION

The present invention overcomes the above-described problems. Beginning with an RRL or ACL with no rule that simultaneously restricts both source and destination address, the method of the present invention converts that ACL to an equivalent minimum-length ACL with no rule that simultaneously restricts both source and destination address. The method uses dynamic programming and special case subroutines.

In describing the techniques of the invention, a colored rectilinear grid is used to illustrate concepts and clarify the operation and results of the various steps of the inventive method. The described grids, however, are by no means intended to be limiting, and it is not suggested that an actual grid is to be constructed to perform the methods described herein. Further, the techniques are sometimes described with reference to only one or the other of an RRL or ACL. Reference to one type of grid is by way of example only and is not intended to exclude the other unless explicitly stated.

Strip-Rule Patterns: Definitions and Characterizations

In this section, the special case of strip-rule patterns is introduced. In ACL terms, this is the commonly encountered case in which no rule restricts both source and destination addresses. Several equivalent characterizations of the patterns are presented that can be constructed with such rules and it is shown that they can be efficiently recognized.

In examining a sample of thousands of extended ACLs from commercial access routers, the inventors have observed that 95.3% of those lists contained no rule that restricted both source and destination IP addresses. In other words, in the vast majority of ACLs, every rule is a strip rule, that is, one that colors either a set of contiguous full columns or a set of contiguous full rows of the grid. Such ACLs are referred to herein as strip-rule ACLs. Thus, patterns that can be generated by strip rules represent an important special case of the general problem from a practical point of view. They are also interesting theoretically.

Figure 1:
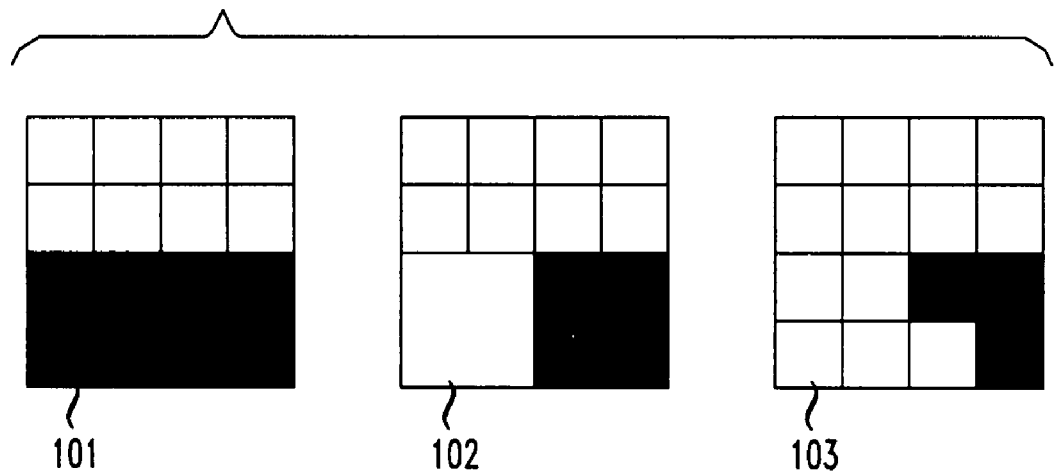
FIG. 1 is a series of example two-color grids showing creation of a figure.
Figure 2:
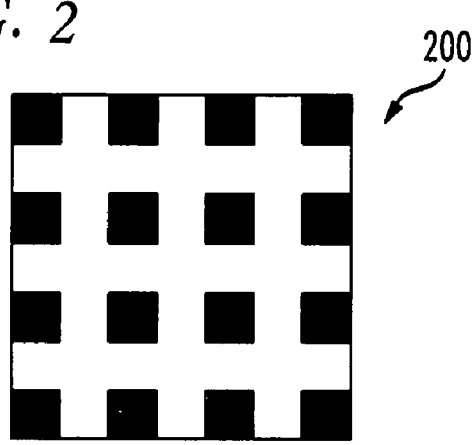
FIG. 2 is another example two-color grid.
Figure 3:
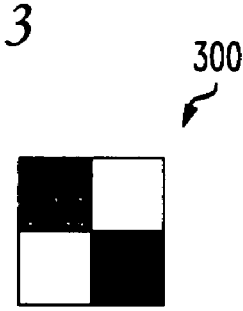
FIG. 3 is another example two-color grid.

The first theoretical question is just what patterns can be generated using only strip rules. Such patterns are herein called strip-rule patterns. Not all patterns are strip-rule patterns; the simple 4-cell checkerboard pattern 300 of FIG. 3, for instance, is not. For black-and-white patterns, however, there is a sense in which the pattern 300 is the only forbidden one, as every non-strip-rule pattern must contain such a checkerboard somewhere. There are, in fact, many equivalent characterizations of strip-rule patterns, as illustrated by the following two theorems, which apply to both RRLs and ACLs.

Theorem 3.1 Suppose P is a 2-color pattern. The following statements are equivalent:
1. P is a strip-rule pattern.
2. P contains no checkerboard subpattern, that is, every 2×2 (not-necessarily-contiguous) submatrix of P contains a monochromatic row or column.
3. (Monotonicity Property). For any color C the rows of P are hierarchical in the sense that for any two rows, the set of columns where C is present in the first row either contains or is contained in the set of columns where C is present in the second.
4. The monotonicity property holds with the roles of row and column reversed.
5. The "Pick-Up-Sticks" algorithm always results in an empty grid.

The "Pick-Up-Sticks" algorithm works as follows. Let gray be a color not used in P. Call a row or column monochromatic if it contains at most one color other than gray. Then perform the following loop: While there is a monochromatic row or column containing a cell with a non-gray color, choose such a row or column and color all its cells gray.

Theorem 3.2 Suppose P is a k-color pattern, k>2. The following statements are equivalent.
1. P is a strip-rule pattern.
2. Every 2×2 and 3×3 submatrix of P contains a monochromatic row or column.
3. The "Pick-Up-Sticks" algorithm always results in an empty grid.

The forbidden submatrix characterizations in Theorems 3.1 and 3.2 are of combinatorial interest, but are not the key to fast recognition of strip-rule patterns. For that the Pick-Up-Sticks algorithm is simply run. By the characterization theorems, P is a strip-rule pattern if and only if the algorithm succeeds in reducing it to the empty grid, and the Pick-Up-Sticks algorithm can be implemented to run in $O(n^2)$ time ($O(n^2w)$ for ACLs), where n is the length of an RRL/ACL that produces P, or is the maximum dimension of the effective grid for the pattern, defined as follows.

For any rectilinear pattern P, call a horizontal or vertical line segment that separates and bounds two differently-colored regions a boundary line. Extend each boundary line in both directions so that it crosses the full canvas. The resulting grid is herein called the "effective grid" for the pattern, and note that all its grid cells will be monochromatic. Moreover, if the pattern is generated by an RRL/ACL with n rules, then the number of (internal) grid lines is at most 4n (or 2n if it is a strip-rule RRL/ACL). Given such an RRL/ACL, the effective grid can be constructed in time $O(n^2)$, with the key subroutine being a linear-time special case of union-find.

The claimed time bound for Pick-Up-Sticks is found by running it on the rows and columns of the effective grid. If P is a strip-rule pattern, an RRL that generates P is produced by viewing each operation as a strip rule. The first one generated will correspond to the last rule in the RRL. (An ACL is not necessarily produced since the effective columns do not necessarily represent legal ACL rectangles, although at most 2w legal rules will suffice to simulate any such strip.)

In what follows it will be convenient to consider the variant on Pick-Up-Sticks we shall call Maximal Pick-Up-Sticks (MPUS), where instead of graying individual rows and columns, the algorithm grays maximal contiguous sequences of rows and columns that collectively contain precisely one non-gray color. The process is halted as soon as the only colors left in the pattern are gray and the background color (white). Like Pick-Up-Sticks, MPUS this is not a well-defined algorithm—it is not defined how to choose the next operation when more than one is available. Even without specifying the tie-breaking rule, however, the following results are produced.

For a strip-rule pattern P, let $OPT_S(P)$ denote the length of the minimum-length strip-rule RRL/ACL that generates P (it will always be clear from context whether the discussion is about RRLs or ACLs). Note that there are practical reasons why one might want to generate such patterns by strip-rules. Technically, strip-rules can be more-efficiently implemented and a good strip-rule RRL/ACL can be a good approximation to an overall optimal RRL/ACL. More importantly, many network management engineers prefer comprehensible router configuration files. If they originally specified an access pattern using strip-rules, they may be more accepting of an optimized ACL if it continues to obey that restriction.

Theorem 3.3 For any strip-rule pattern P,
1. All RRLs generable for P using MPUS are no longer than $2OPT_S(P)+1$, and
2. All ACLs generable for P using MPUS are no longer than $wOPT_S(P)+3$.

Those bounds hold for any number of colors. The bound for RRLs follows from the fact that any maximal rule except possibly the last must reduce the number of effective grid lines by 1, while the ACL bound requires a different argument. The bounds are tight in the sense that for RRLs there exist patterns P with arbitrarily large values of $OPT_S(P)$ for which MPUS can generate RRLs of length $2OPT_S(P)+1$ and for ACLs there exist patterns P' with arbitrarily large values of $OPT_S(P')$ and w for which MPUS can generate ACLs of length $\Theta(w)OPT_S(P')$.

2-Color Strip-Rule Patterns: Constructing Optimal RRLs and ACLs

In this section are presented polynomial-time algorithms for constructing optimal strip-rule RRLs and ACLs for 2-color strip-rule patterns, applicable to real-world access router ACLs. It is assumed that the pattern is given by its effective grid, and without loss of generality, it is assumed that the grid has $N_1$ rows and $N_2$ columns, where $N_1 \geq N_2$.

Figure 4:
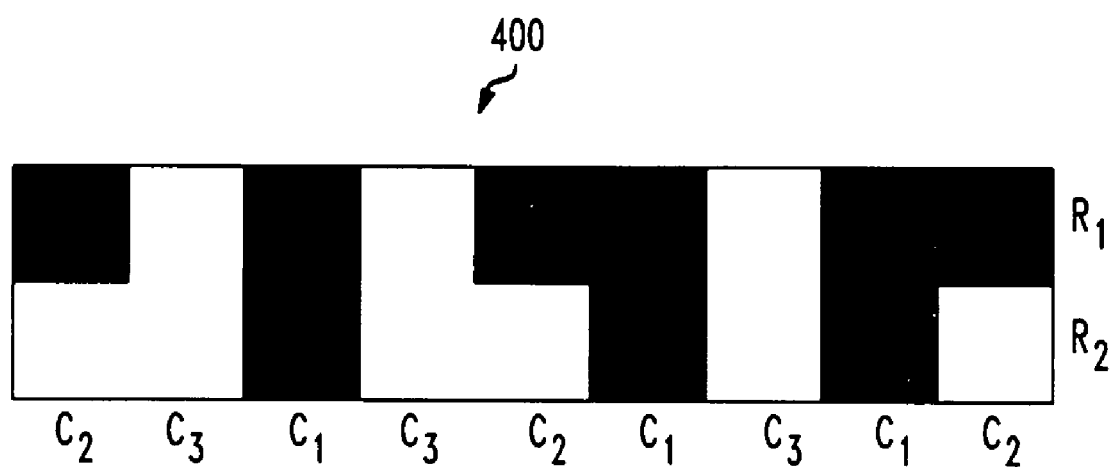
FIG. 4 is another example two-color grid, showing equivalence classes.

It is not difficult to see that finding an optimal RRL/ACL is equivalent to finding an optimal ordering of operations for MPUS. In what follows, a column/row is said to be "picked-up" by a rule if it is covered by the rule and was not all gray at the time the rule was applied. Hence, no column/row can be picked up more than once. The inventive method exploits the fact that the rows and columns of a pattern P may be divided into equivalence classes, with two columns (rows) being equivalent if their corresponding cells are identically colored in the original pattern P. For example, a pattern 400 is shown in FIG. 4 having rows and columns labeled by their equivalence class. The column equivalence classes are all-black columns ($C_1$), bicolored columns ($C_2$), and all-white columns ($C_3$). Each of the row equivalence classes has a single member, with $R_1$ consisting of the top row and $R_2$ consisting of the bottom row. The following observations are easy to verify for 2-color patterns P:

1. In any MPUS rule, all the rows/columns that are picked up are in the same equivalence class.
2. If some member of an equivalence class is picked up by a rule of color c, then all members of that class must eventually be picked up by c-rules.
3. Every class is either picked up by white rules, picked up by black rules, or not picked up, with at most one row class and one column class in the third category.
4. For an equivalence class E, let $N_w(E)$ be the number of white cells its members contain in P and $N_b(E)$ the number of black cells. Then no two column (row) equivalence classes have the same value of $N_w(E)$ or $N_b(E)$ (this follows from the monotonicity property in the above characterization theorem).
5. For any equivalence class E and any color $c \in \{b, w\}$, no member of E can be picked up by a c-rule until all members of classes E' of the same type (row or column) with $N_c(E') > N_c(E)$ have also been picked up by c-rules.
6. At any point in the MPUS process, exactly two equivalence classes will be monochromatic and hence ripe for pick-up (by black and white column rules, black and white row rules, black row and column rules, or white row and column rules).

To understand the global structure of our algorithm, suppose for the moment that only of interest are RRLs/ACLs in which all members of one of the two current monochromatic classes are always picked up before any member of the other. Suppose four lists are provided: $L_{C,b}$, $L_{C,w}$, $L_{R,b}$, and $L_{R,w}$, with $L_{y,c}$ comprising the y equivalence classes (y=R for row, y=C for column), sorted in decreasing values of $N_c(E)$. For the example in FIG. 4, the lists are $L_{C,b}=(C_1, C_2, C_3)$, $L_{C,w}=(C_3, C_2, C_1)$, $L_{R,b}=(R_1, R_2)$, and $L_{R,w}=(R_2, R_1)$. Consider the situation when first a specific pair of equivalences becomes monochromatic. At that point by (5) above the set of already-picked-up equivalence classes must be the disjoint union of a prefix from each of the four lists and the identity of the two monochromatic classes (and their colors) are determined by that prefix union. No matter this point is reached, what remains to be done is exactly the same.

This suggests a dynamic programming algorithm, where the states are the $O(n^4)$ possible prefix unions and the value of a state is the minimum-length RRL/ACL needed to reach it. Each state has at most four immediate predecessors, and the value of each of the four alternatives can be determined from the value for that predecessor plus the value of the solution to a one-dimensional problem (optimally picking up one equivalence class). The optimal RRL/ACL could then be determined by examining the values of all those disjoint prefix unions that cover all the equivalence classes or leave only monochromatic white classes. The overall time would thus be $O(n^5)$ for RRLs and $O(n^5w)$ for ACLs.

Unfortunately, the assumption, that all members of one of the two current monochromatic classes must always be picked up before any member of the other, is not justified, as illustrated by the pattern in FIG. 4. In that example, the monochromatic classes are $C_1$ (all-black columns) and $C_2$ (all-white columns), and five rules are required to pick up $C_1$ followed by $C_3$ or $C_3$ followed by $C_1$, but only four to pick up $C_1$ and $C_2$ if intermingling is allowed. Thus, instead of being able to restrict attention to states consisting of pairs (U, V) of currently monochromatic equivalence classes, the possibility must be allowed that some of the members of each class were picked up while processing earlier classes. That means that states may need to have the format $(U, V, T_U, T_V)$, where $T_U$, a subset of U, is the set of remaining unpicked-up ("live") members of U at the time when U and V for the first time were both monochromatic, and $T_V$, a subset of V, is the set of "live" members of V. Potentially this is an exponential number of states.

The inventors have discovered that it is possible to get around that obstacle by showing that additional structure can be imposed on those states if the right algorithms are used for the one-dimensional subproblems. That discovery has made possible the unexpected polynomial-time algorithm for the strips case used in the present invention.

In particular, it can be shown that all reachable states are of the form (U, V, U, T) or (U, V, T, V), where if (U, V, U, T) and (U, V, U, T') (where T, T' are subsets of V) are distinct reachable states, then either $T \subset T'$ or $T' \subset T$, and similarly for (U, V, T, V) and (U, V, T', V) (where T, T' are subsets of U). That means that for any pair U, V there can be at most 2n distinct states for a total of at most $O(n^3)$ and a more careful accounting reduces the bound back to $O(n^2)$. The overall running times then become $O(n^3)$ and $O(n^3w)$ as before.

In order to get those structural results, the one-dimensional subroutine F must satisfy certain properties. Suppose a state is given $X=(U, V, T_U, T_V)$ in which U and V are column classes and c is a color (the case for row classes is analogous). Let $P_X$ denote the black-white-gray pattern corresponding to X. The output F(X, c) is a minimum-length set of rules that picks up all monochromatic c-colored columns of $P_X$ plus possibly some of the monochromatic columns of the other color. Let f(X, c) denote the state that results from applying F(X, c) to X. For any state X let B(X) denote the set of monochromatic columns containing a black cell and W(X) denote the set of monochromatic columns containing a white cell. Note that for state $X=(U, V, T_U, T_V)$ the sets B(X) and W(X) are the sets $T_U$ and $T_V$ in some order. Say a sequence of pick-ups (rules) handles X if it reduces $P_X$ to a pattern with no black cells. Call such a sequence a c-priority RRL/ACL if all c-colored columns are picked up before the last column of the other color is picked up. F needs to satisfy the following properties.

(P1) For any state X and each color c, the set of all c-priority RRLs/ACLs that handle X contains a minimum-length RRL/ACL that starts with F(X, c).

(P2) Suppose $X=(U,V,T_U,T_V)$ and $X'=(U,V,T'_U,T'_V)$ are two states with

1. $W(x)=W(X')$
2. $B(X) \subseteq B(X')$

Then $\overline{B}(f(X,W)) \subseteq B(f(X',W))$ and $W(f(X',B)) \subseteq W(f(X,B))$. In other words, under the given hypotheses, using F to pick up the white class will leave the resulting subsets of live members of the black class in the same containment relation as in X and X', while using F to pick up the black class will result in subsets of the white class that now obey a containment relationship, but in the reverse order from that of the live black subsets in X and X'.

(P3) Property (P2) holds with the roles of W and B interchanged.

For RRLs the subroutine that satisfies these properties is straightforward. To illustrate it by example, suppose the current state X contains black and white monochromatic columns and F(X, W) is to be applied. Consider the maximal sequences of monochromatic columns, none of which contains a white cell and at least one of which contains a black cell. For each such sequence that is bordered on both left and right by a monochromatic white column, that sequence with a single black rule is picked up. The method then picks up each maximal sequence of monochromatic columns, none of which contains a black cell and at least one of which contains a white cell, using one rule for each such sequence. (If all black monochromatic columns disappear in the first step, this is not a valid start to a W-priority RRL, but more precise definitions allow the method to account for that anomaly.)

Approximation Algorithms for Unrestricted Patterns

Work remains to be done with respect to approximation algorithms for the original arbitrary-rectangle versions of the RRL/ACL problems. Previous work has all concentrated on 2-color patterns and the problem of constructing or approximating the best ACL consisting only of black rules. That work was surveyed above, where it was observed that unfortunately the heuristic that uses the best possible ACL consisting only of black rules is not very effective when applied to the problem of finding the best overall ACL—if n is the number of grid lines in the effective grid for P, it can be off by a factor of n.

In that context, the present invention provides a significant improvement. An algorithm is described that uses Maximal Pick-Up-Sticks as a subroutine and produces an RRL that exceeds optimal by no more than a factor of $O(\sqrt[3]{\sqrt{n}})$. The algorithm works for patterns with arbitrary numbers of colors and should be extendible to ACLs at a cost of an additional $O(w^2)$ in the guarantee.

The algorithm, called herein the Iterated Strip-Rule algorithm (ISR), works as follows. Suppose the pattern is given by its effective grid and assume that the number $N_{col}$ of columns is at least as large as the number $N_{row}$ of rows. Note that $OPT(P) \geq (N_{col}/2)$ since no rule can introduce more than two new effective vertical grid lines. The basic approach is to partition P into subrectangles that are all strip-rule patterns, each of which can be handled by Maximal Pick-Up-Sticks. That is done for several different partitions, and the best result is taken.

More formally, for each integer q, $1 \leq q \leq N_{col}$, the following is done: First the grid is partitioned into q horizontal strips of heights as close to $N_{col}/q$ as possible. Each strip is then partitioned into a sequence $B_1, B_2, \ldots$ of blocks, starting from the left. The odd-indexed blocks (the good blocks) are subrectangles that extend to the full height of the strip and as far to the right as they can while still constituting a strip-rule pattern. Each good block that does not extend all the way to the right boundary of P is followed by a bad block that is a width-1 subrectangle to the immediate right of the good block, extending the full height of the strip. Note that such rectangles are trivially strip-rule patterns. Let $\mathfrak{R}_q$ be an RRL constructed by using the Maximal Pick-Up-Sticks heuristic to handle each of the blocks separately. Strips for the block will typically be rectangles in terms of the overall pattern. The output is the better of: the best of the $N_{col}$ RRLs and the input RRL.

Theorem 5.1 The iterated strip-rule algorithm runs in polynomial time and produces an RRL whose length is $O(\sqrt[3]{\sqrt{n}}OPT(P))$.

Key to the proof are the observations that (1) the RRL created by MPUS for a p×q rectangle uses at most p+q rules, (2) the union of each bad block with its preceding good block contains either a 2×2 or 3×3 submatrix with no monochromatic rows or columns, and (3) the number of geometrically disjoint submatrices of this type is no more than 4OPT(P).

No polynomial-time heuristic is known with a better worst-case guarantee.

Additional Results and Open Problems

Much of the above concentrates on strip-rule RRLs and ACLs for strip-rule patterns. However, in some applications one might be able to use arbitrary RRLs/ACLs for such patterns, in which case one might ask about the performance penalties imposed by the restriction to strip-rule RRLs and ACLs. Fortunately the penalty is not too severe, at least in the case of RRLs.

Theorem 6.1 For RRLs and for any strip-rule pattern P, $OPT_S(P) \leq 4OPT(P)+1$.

That theorem follows from the fact that no rectangle rule can introduce more than four effective grid lines and every strip-rule must eliminate at least one, with the possibility of one final rule to color any cells remaining after all effective grid lines have been eliminated. The inventors have shown that the actual asymptotic bound is at least 3.5, and possibly 4, based on a sequence of patterns $P_k$ that have $OPT(P_k)=2k+2$ and appear to have $OPT_S(P_k)=7k+6$, a fact that has been verified for $k \leq 100$ using the optimization algorithm described above. For ACLs, the upper and lower bounds are once again proportional to the IP address length w.

Given the complexity of our optimization algorithms, one might also ask what kind of performance guarantees one can get with fast(er) approximation algorithms. The best result of this type currently known to the inventors is a $\Theta(n^2)$-time algorithm that has an asymptotic 3/2 approximation guarantee for strip-rule RRLs. No way of quickly generating strip-rule ACLs with guaranteed length $o(wOPT_S(P))$ is yet known.

Perhaps the main open problem is that of improving on the approximation algorithms described above for the case of arbitrary patterns, both for RRLs and ACLs. This of course assumes that the problems of minimizing RRLs and ACLs are NP-hard for arbitrary patterns. The inventors have proven that NP-hardness for RRLs by carefully embedding the NP-hard all-black-rule problem into a sufficiently constraining background pattern, although a different approach would be needed to prove NP-hardness for the ACL problem.

Description of Solution Methods

Suppose a pattern P is an m×n matrix of 0's and 1's. That corresponds to a pattern to be generated using a rectangle rule list (RRL) (wherein 1 is the color black and 0 is the color white), or the actions we wish to perform on IP packets using an access control list (ACL) (wherein 1 is "forward the packet" and 0 is "discard the packet").

The latter ACL case must satisfy $m=n=2^w$, where w is the number of bits in an IP address, and the action for a packet with source and destination IP addresses and d is determined by the entry in cell $P_{s,d}$. For example, if IP addresses had four bits, instead of the 32 they now have, the relevant matrix would be 16×16 because there would be $16=2^4$ possible IP addresses, from 0 to 15. To be consistent with this, the columns and rows of P are indexed starting with 0, so, in that case, they would be labeled 0; 1; 2; 3; . . . ; 15 in turn. In order to determine what to do with a packet whose source address is 0110 and whose destination address is 1001, we would look up the entry in the table whose row is labeled 6 (because 0110 is the binary representation of 6) and whose column is labeled 9 (because 1001 is the binary representation of 9). If the entry in the matrix is 1, the packet would be forwarded to its destination; if the entry is 0, it would be discarded.

The colors black and white, and the numbers 1 and 0, respectively, are used interchangeably herein. The basic goal is to construct a given target matrix via "painting" operations, when starting from a matrix all of whose cells are white. Each painting operation takes a subrectangle of the current matrix and either paints it all black, overwriting whatever colors were there before, or paints it all white, overwriting whatever colors were there before. The goal is to construct the target pattern P with as few painting operations as possible. Note that each such operation can be formally specified by an ordered pair (R, c), where R is the rectangle to which it applies and c is the color that is painted. Such an ordered pair is called a rectangle rule or a rectangle move. A method for constructing P then corresponds to a sequence of such moves, which is called a "rectangle rule list" or RRL. The goal can then be restated as finding a minimum length RRL that constructs the pattern P.

In the RRL case, any subrectangle R is allowed in a rectangle move. In the ACL case, that is not so. That is because the application requires that the rectangles be representable by an ordered pair of prefixes of IP addresses, where the rows and columns of the rectangle are restricted to just those whose IP addresses have the corresponding prefix. To see how this works, consider again the case where IP addresses are of length w=4. In that case, the ordered pair (0, 10) of prefixes would represent the rectangle comprising rows 0 through 7 (those whose indices have 4-bit binary representations that start with 0) and the columns with indices 8 through 11 (those whose indices have binary representations that start with 10). Thus it is required that both the number of rows in the rectangle and the number of columns be powers of two. In other words, the allowed rectangles R must have height $2^h$ for some integer h, and width $2^k$ for some integer k. Moreover, the index of the bottommost row in R must be a multiple of $2^h$ and the index of the leftmost column must be a multiple of $2^k$. For example, a 7×8 rectangle would not be allowed, since 7 is not a power of 2. An 4×8 rectangle would be, 4 being its height and 8 its width, provided that the index of its bottommost row is a multiple of 4 (that is, 0, 4, 8, 12, 16, . . . ) and the index of its leftmost column is a multiple of 8 (that is, 0, 8, 16, . . . ). An access control list or ACL is an RRL all of whose moves obey this restriction. For the ACL application the goal is to find a minimum-length ACL that constructs the target pattern P.

Instead of starting with an all-white matrix, and painting rectangles all black or all white until the target matrix is achieved, it is more convenient to view the problem in reverse. Starting with a given matrix, whose cells are black or white, the goal is to generate a matrix with no black cells by repeatedly turning "gray" all the cells in some rectangle, where gray is a new color distinct from black and white. A rectangle is referred to herein as pseudo-monochromatic if its cells are all white or gray, or all black or gray (i.e., cannot have both white and black cells). Those rectangles are called "pseudo-monochromatic" because it is almost monochromatic (having one real color, black or white). The basic coloring operation is to pick a legal pseudo-monochromatic rectangle and paint it gray. (In the RRL case, every rectangle is legal. In the ACL case, only those rectangles with side length a power of 2, suitably placed, are legal.) The goal is to reach a matrix with no black cells using as few painting operations as possible. The overall process is referred to herein as "graying the pattern." It turns out that this is precisely the original coloring problem, in reverse. Operations can still be viewed as ordered pairs (R, c), where now c refers to the color, black or white, present in the pseudo-monochromatic rectangle to which the operation is applied. If $\Re$ is a minimum length RRL for the original problem, then reversing the order of the moves in $\Re$ yields a minimum length RRL for the new problem. Moreover, in the ACL application the rules are actually ordered in this way, with the action for a packet with source IP address s and destination IP address d determined by the color c of the first rule (R, c) in the list whose rectangle R contains the cell $P_{s,d}$.

The presently presented algorithms do not solve the stated problems in all their generality. Instead, the problems are solved for the important special case of "strip-rule patterns" P. Specifically, call a rectangle that extends either for the full width of the matrix, from left to right (containing some or all of the rows) or the full height, from top to bottom (containing some or all of the columns), a strip. Call a move (R, c) a strip move if the underlying rectangle R is a strip. Call an RRL/ACL, all of whose moves are strip moves, a strip-rule RRL/ACL. Then a "strip-rule pattern" is one that can be turned wholly gray by some strip-rule ACL. Note that if a pattern can be turned gray by a strip-rule RRL, then it can also be turned wholly gray by a strip-rule ACL: simply divide each horizontal strip move of height h into a sequence of h strip moves each only one row high (which by definition are all legal ACL moves) and handle vertical strip rules analogously. Note that not all patterns are strip-rule patterns. A 2×2 matrix whose upper left and lower right cells are black and whose other two are white is not a strip-rule pattern.

Such strip rule patterns can easily be recognized by the "Pick-Up-Sticks" algorithm, that starts with the given pattern P and then repeatedly chooses any applicable strip move and applies it. If the process ever reaches a pattern in which not all cells are gray but no applicable strip move exists, then the original pattern was not a strip-rule pattern (that is not obvious but true). Otherwise the process ends with an all-gray pattern and the sequence of rules thus generated is a valid strip-rule ACL for P, which hence is a strip-rule pattern.

Given a strip-rule pattern P, the presently-described algorithms find a minimum-length strip-rule RRL and a minimum-length strip-rule ACL that realize it. If P is not a strip-rule pattern, the algorithms will report that fact. The algorithm for RRLs runs in $O((m+n)^3)$ time or, if the pattern is given implicitly by a strip-rule RRL of length N that generates it, in time $O(N^3)$ time. In the ACL case it may be assumed the pattern is given by a strip-rule ACL, and the running time is $O(N^3w)$, where N is the length of the given ACL and w is the length of an IP address.

The algorithms both exploit the fact that, as shown in above, a minimum length RRL/ACL can be viewed as a run of Pick-Up-Sticks which is optimum among those with a particular overall structure. To explain that structure, some additional terminology is introduced. Say that two rows (or two columns) in a black-and-white pattern are equivalent if they have identical contents; that is, all of the corresponding cells in the two columns or two rows have exactly the same colors. Based on that equivalence relation, the columns and rows can be partitioned into sets of equivalence classes $C_1, C_2, K\ C_{k_C}$ and $R_1, R_2, K\ R_{k_R}$, where all the members of each $C_i$ ($R_i$) are equivalent to each other, but none is equivalent to a member of any other class.

Now suppose that P is a black-and-white strip-rule pattern, that P' is a pattern reachable from P by applying a sequence of strip moves, and that P' contains at least one black or white cell. So as to avoid writing "row or column" too often, rows and columns are hereinafter called "lines." A line is called active in P' if it is pseudo-monochromatic and contains at least one black cell (and hence zero white cells) or one white cell (and hence zero black cells). Active lines are, in addition to all-gray lines, exactly the ones that Pick-Up-Sticks has a chance of picking up; that is why they are important. A line is called white if it is pseudo-monochromatic with at least one white cell and black if it is pseudo-monochromatic with at least one black cell. As shown above, at any given time while Pick-Up-Sticks is running, prior to the time when it finishes and the whole matrix is gray, there must be exactly two equivalence classes (either two row classes, one black and one white; or two column classes, one black and one white; or a white row class and a white column class; or a black row class and a black column class), such that all active rows and columns are in these two classes, and each contains at least one active member. Those classes are called the two live classes for P'. Since Pick-Up-Sticks picks up active and all-gray columns, it is restricted to picking up active columns from those two equivalence classes. Because, as noted above, at any given time, there are precisely two live equivalence classes, if Pick-Up-Sticks picks up all the columns, say, in one equivalence column class E', some other equivalence class E' must automatically become live (since there must be two live ones at any time). If E' is a row class then E' will be a column class, and vice versa.

Thus if the sequence of operations performed by an RRL or ACL is written down, the sequence of steps can be partitioned into blocks, according to which pair of equivalence classes was live at the time. Maybe equivalence classes 7 and 10 are live for the first 13 moves of Pick-Up-Sticks; then classes 7 and 4 are live for the next two moves; then classes 4 and 12 are live for the next 16 moves; etc. Let us call the block of operations during which a given pair of equivalence classes is live a segment. At the end of a segment, one equivalence class has just died, and a new one, all of whose members are live, has just appeared. The rows or columns of the older live equivalence class may not all be active at the end/beginning of a segment; some may already have been turned gray. There is thus an asymmetry: at the end/beginning of a segment, in one equivalence class, all lines are active; in the other, that may not be the case. As shown above, given the knowledge of which two equivalence classes are live at the beginning of a segment, the color of their non-gray cells, and which lines are active in the older equivalence class, one can infer the color (black, white, or gray) of every cell in the pattern at that time.

What that means is that the state of the algorithm, at the beginning of a segment, can be described by giving: (1) the identity $E_1$ of the newer equivalence class, all of whose lines are live; (2) the color $c_i$, black or white, of its non-gray cells; (3) the identity $E_2$ of the older equivalence class (some, but not necessarily all, of whose lines are live); (4) the color $c_2$, black or white, of its non-gray cells; and (5) the subset U of $E_2$ whose lines are active.

An optimal RRL or ACL must next be found. It is known that at the beginning of the, say, $i^{th}$ segment, exactly two equivalence classes will be live; it is not known which ones. If one equivalence class is a column class and one is a row class, then the determination is simple. The optimal rule list picks up all the columns in the column class in the segment, and nothing else, or all the rows in the row class, and nothing else. The interesting and more challenging case is the one in which both live equivalence classes are column classes (or both, row classes). In that case, the active color in one class is black and in the other, is white. During that segment, exactly one of the two equivalence classes will be consumed and disappear, leaving the other one to persist into the next segment. But it is not known which one. It can be said, however, that if there is an optimal RRL (or optimal ACL) that chooses, say, to consume $E_2^i$ rather then $E_1^i$, by picking up columns whose cells are pseudo-monochromatic-$c_2^i$ (where $c_2^i$ is black or white), then it should do so, within the segment, with as few moves as possible. Furthermore, it seems natural that if all the columns are picked up of color $c_2^i$ in a segment with, say, seven moves, and there is a tie, and one way of doing so "accidentally" also picks up three columns in the other equivalence class, and the other way of doing so picks up those three columns and some more, then the second method is better. Among all minimum-length sequences of moves that pick up all the columns of the selected equivalence class, choose the one that also, "by accident," picks up as many of the other equivalence class as possible.

For an RRL example, suppose that columns 1, 3, and 5 are black and columns 2 and 4 are white. One could pick up columns {1, 3, 5} in three steps, by picking up columns 1, 3, and 5 with three separate black moves. But it is clearly better to pick up column 2 first with a white move, then column 4 with a white move, and then columns 1, 2, 3, 4, 5 with a black move. The latter way also takes only three moves, but picks up a superset of the columns picked up the former way. That, at least, is the idea behind subroutines RRLsub and ACLsub. Using the motivation leads to an optimal RRL or ACL algorithm.

So if the state at the beginning of one segment is known, there is only a two-way choice to be made by the algorithm in the segment—namely, which of the two equivalence classes to consume completely—since it is not known how best to consume that class. By the previous paragraph, that equivalence class with as few operations as possible will be consumed, say, picking up black and gray columns, and, in the process, also consume as many white columns in the second equivalence class as possible. That intuition is formally correct for the RRL case. While it is not exactly right for ACL's, it is close enough to give the flavor of the algorithm.

At this point a recursive algorithm suggests itself: from the initial state, either consume all of the first equivalence class $E_1^i$ and as much as possible of the other one $E_2^i$, or all of the second class $E_2^i$ and as much as possible of the first one $E_1^i$. The optimal cost of the initial state is then determined by the optimal costs of the two resulting states and the lengths of the segments necessary to reach them. More formally, a list can be maintained that initially contains only the initial state. Then the initial state is removed from the list and replaced by the two "children" states, remembering how the cost of the initial state is calculated by the costs of the two children. Then one more state is removed from the list and replaced by its two children, etc. Of course there is no need to have duplicates, so if the same state is already in the list, it is not added a second time, but the cheapest route is remembered to it from the initial state. Eventually, the great-great-great- . . . -great-grandchild is a state corresponding to a matrix with no black cells. That is a state whose cost is known (0, since it takes 0 moves to gray out all the nonexistent remaining black cells), and that state is used to calculate the cost of its parents, and grandparents, etc.

Such a method will definitely correctly calculate the optimal cost of the initial state. The drawback is that whenever one replaces one item by two recursively, one is inviting an exponential blow-up and a very slow algorithm. (If each person has two children, then there are $2^m$ $m^{th}$-generation descendants.) A key relevant result set forth above is that that does not occur, in either the RRL or ACL case. Instead, the number of distinct states stays bounded by a polynomial.

In an explanatory example, supposed a person had two children, and each of the two children had two children, but somehow only three of the four grandchildren are distinct, so one duplicate is killed off. Each of the three living grandchildren has two children, but magically the grandchildren discover that together, they have only three distinct children out of six. The three duplicates are killed off, and only three distinct great-grandchildren remain. Such a painful and morally questionable process would certainly eliminate Malthusian exponential population growth.

Thus any RRL/ACL generated by Pick-Up-Sticks can be viewed as a sequence of segments, during each of which some specific pair of equivalence classes is live. That structure may be summarized as a sequence $<Q_0, Q_1, Q_2, \ldots, Q_m>$ of states $Q_i$, with $Q_i$ being a quintuple $(E_1^i, c_1^i, E_2^i, c_2^i, U^i)$ where for all i<m, $E_1^i$ and $E_2^i$ are the two live classes during the $i^{th}$ segment, $c_1^i$ and $c_2^i$ are the respective colors, black or white, of their non-gray cells, and U is the set of active members (at the beginning of the segment) of the older of the two classes, by convention $E_2^i$. Note that for each i, 0<i<m, exactly one live class in the corresponding segment must have persisted from the previous segment, and one segment will be new, with all its members initially active. At the beginning of the first segment, all members of both classes are active, so one can be assigned to be the "older" one $E_2^i$, arbitrarily. The final state $Q_m$, which corresponds to the all-gray pattern and has no live classes, will be represented by the quintuple $(\phi,0,\phi,0,\phi)$. As remarked above, each such quintuple $(E_1, c_1, E_2, c_2, U)$ completely determines the pattern P' in existence at the beginning of the corresponding segment. That pattern will be denoted by pattern $(E_1, c_1, E_2, c_2, U)$ Call that sequence of quintuples the superstructure of the RRL/ACL.

The problem of finding an optimal RRL/ACL will be broken into two parts:
1. determining the superstructure, and
2. determining the actual sequence of moves within each segment. (This segment optimization step is done by either RRLsub or ACLsub.)

The first part is handled by recursion over a state space comprising reachable states $(E_1, c_1, E_2, c_2, U)$. That part of the algorithm is the same for both RRLs and ACLs. In the second part the particular details for ACLs are different from those for RRLs. In the actual algorithm, the search for the superstructure calls the segment optimization algorithm as a subroutine. The segment optimization routine never calls the superstructure procedure.

In the overall algorithm, a priority queue of states is maintained, and for each such state (i.e., quintuple) Q, three values are maintained:
1. cost(Q), an estimate for the minimum length of a sequence L(Q) of Pick-Up-Sticks moves that transforms the pattern pattern($Q_0$) associated with the initial state $Q_0$ into Q. (Thus cost(Q) is simply a number.)

2. segment(Q), the list of moves in the last segment of L(Q). (Thus this is a sequence of moves and, unlike cost(Q), not a number; however, it is only a suffix of the sequence L(Q) which was defined in part 1.)
3. pred(Q), the predecessor state that segment(Q) transformed into Q.

The following algorithm takes as input the initial pattern P and the type X of list required, with X="RRL" for RRLs and X="ACL" for ACLs. It outputs a minimum-length RRL/ACL for generating P. It calls either subroutine RRLsub for the RRL case or ACLsub for the ACL case. Given the current pattern and a specified equivalence class, the called subroutine returns an optimal list S of moves to gray all active members of a specified pseudo-monochromatic class. For simplicity, it is assumed that P is already known to be a strip-rule pattern. The algorithm is a variant of Dijkstra's algorithm for computing shortest paths in a graph.

The colors white and black are used throughout the present application to represent two possibilities, such as the permit and deny actions contained in an ACL, or the two colors in a black and white image. The color gray is also used throughout the present application to represent a location where a move has "picked up" a white or black cell; i.e., cells that are neither white nor black. One skilled in the art will recognize that any other color, or any other representation, may be used in place of the white/black/gray notation used herein, without departing from the scope of the invention.

If the algorithm below is designed to eliminate all cells are of a given color (e.g., black), a "final state" is defined as a state containing no cells of that color. In that case, all cells in the final state are either white or gray.

ALGORITHM(P;X):
Initialize a priority queue to contain the single state $Q_0$.
Set cost($Q_0$)=0.
Set segment($Q_0$)=$\phi$.
Set pred($Q_0$)=$\phi$.
Do forever:
    Extract from the priority queue the state of minimum cost and call it Q=($E_1$, $c_1$, $E_2$, $c_2$, U).
    Let P'=pattern(Q), the pattern associated with state Q.
    If P' is a final state (i.e., a state having no black cells and thus having only white and gray cells), then exit the Do loop.
    for i=1, 2 do
      if X="RRL" then
        set S=RRLsub(P', $E_i$);
      else
        set S=ACLsub(P', $E_i$).
      end if
      Let Q' be the state resulting from applying to P' the moves in S.
      if Q' is already in the priority queue then
        if cost(Q')>cost(Q)+|S| then
          Change the cost, segment, and pred of Q' to the following values
          (this can be done by deletion and reinsertion of Q'):
          cost(Q')=cost(Q)+|S|,
          segment(Q')=S,
          and pred(Q')=Q.
        end if
      else
        Add Q' to the priority queue with cost(Q')=cost(Q)+|S|,
        segment(Q')=S, and pred(Q')=Q.
      end if
    end for
end do (We've reached this point because we've found a final state Q; i.e., a state whose pattern has only white and gray cells.)
Set L=< >, an empty list.
while Q≠$Q_0$ do
   Prepend segment(Q) to list L.
   Set Q=pred(Q).
end while Now will be described the two subroutines RRLsub and ACLsub. For concreteness, they will be described for the case in which the class E to be removed is a column class; the procedures for row classes are entirely analogous. The second equivalence class can either be another column equivalence class, which is the more difficult case, or a row equivalence class.

The color of a pseudo-monochromatic column is said to be gray if all its cells are gray, and otherwise is the color of its black or white cells. In the descriptions, a column is referred to as bad if it is not pseudo-monochromatic. Those are columns that simply cannot be picked up now by Pick-Up-Sticks.

RRLsub works for RRLs and is the simpler of the two subroutines. Call a set of contiguous pseudo-monochromatic columns in P' a black column block if it consists entirely of pseudo-monochromatic columns, each of those columns is either gray or black, at least one of them is black, and the sequence cannot be extended left or right without violating those properties. Call a black column block an embedded black column block if the columns to its immediate left and right are active white columns (rather than bad columns). Define white column block and embedded white column block similarly, by swapping "black" and "white" in this paragraph.

In the subroutine below, it is assumed that the color of non-gray cells in columns of E, the class to be eliminated from pattern P', is black. To write the subroutine for the other case, simply swap "black" and "white" throughout. (If the second equivalence class in P' is a row equivalence class, then there are no white column blocks at all, in which case much of this procedure is vacuous.)

RRLsub(P', E):
  Initialize the output segment S=< > to an empty list.
  (First all embedded white column blocks are picked up:)
  for each embedded white column block in P', in any order, do
    Append to S a white move that turns this column block gray.
  end for
  Let P'' be the pattern that results from applying the moves in S to P'.
  (Now all the black column blocks in P' are picked up:)
  for each black column block in P'', in any order, do
    Append to S the black move that turns this black column block gray.
  end for
  return S.

Subroutine ACLsub, which works for ACLs, is more involved. The fact that it successfully constructs an optimal segment in the context of the overall algorithm requires a fairly complicated proof. The complexity of the algorithm is due to the fact that now not every interval can correspond to a move. As mentioned above, {4,5,6,7} does correspond to an ACL move; {3,4,5,6} and {4,5,6} do not. Suppose that the IP address length is w, so that column indices range from 0 to $2^w-1$. Now the only sequences of columns that can be involved in a move are ones that correspond to IP address prefixes. To simplify the notation, a move is here denoted by an ordered pair (p, y), where p, the prefix, is a (possibly empty) string of 0's and 1's of length at most w, and y is either "black" (i.e., 1) or "white" (i.e., 0). The columns addressed by prefix p are all those whose index, expressed as a w-bit binary number, starts with the string p; in what follows the prefix p is identified with that set of columns. (For example, if w=4, then p=<0; 1> addresses 0100=4, 0101=5, 0110=6, and 0111=7.) Call a prefix legal if each of the columns it addresses is currently pseudo-monochromatic. Call a legal prefix p minimal if no proper prefix of p is also legal. Note that the minimal legal prefixes correspond to disjoint intervals and collectively include all active columns.

Subroutine ACLsub makes use of two additional subroutines, both recursive. It first uses subroutine COSTCOMPUTE to compute two auxiliary functions, cost(p, y) and rule(p, y), where y∈{0,1} is a color (1 being black and 0 being white), and p is a legal prefix. cost(p, y) is the minimum cost to make all the columns addressed by p pseudo-monochromatic y, that is, either all gray, or all gray and color-y. The binary "helper" function rule(p, y) is 1 if and only if there is an minimum-length sequence of moves that makes all the columns addressed by p pseudo-monochromatic y and concludes with the rule (p, y). Based on the values of these functions, a second recursive subroutine LISTGEN is used to construct the optimal ACL.

First is given the overall structure of ACLsub, and then the two recursive subroutines are specified. As in the RRL case, it is assumed that the color of non-gray cells in columns of E is black. To write the subroutine for the other case, simply swap "black" and "white" throughout.

ACLsub(P', E):
  for each minimal legal prefix p in P' do
    Call COSTCOMPUTE(P', p).
  end for
  Initialize the output segment S to the empty list < >.
  for each minimal legal prefix p in P' do
    Call LISTGEN(P', p 0).
  end for
  return S.

In order to improve the efficiency of the recursive subroutines, an additional concept is exploited, that of a pure legal prefix. Call a legal prefix p pure if the columns it addresses contain at most one black or white color. Note that if a legal prefix p addresses a single column (that is, p's length is w), then p is a pure prefix. Furthermore, if a legal prefix p is not a pure prefix, it must address more than one column and hence the prefixes p ○ 0 and p ○ 1 obtained by appending a 0 or 1, respectively, to p will also be legal prefixes. Define the color of a pure prefix to be gray if all the columns it addresses are gray and otherwise to be the color of the active columns it contains. The subroutines are called with two arguments: the pattern P' and the legal prefix p.

COSTCOMPUTE(P', p):
if p is a pure prefix then
  Let c∈{0,1,"gray"} be the color of p.
  if c is gray then
    Set cost(p, 0)=cost(p, 1)=0. (No moves are necessary, whether the target color is white or black, if all the columns addressed by p are already all-gray.)
  else
    Set cost(p, c)=0 and cost(p, 1−c)=1. (No moves are necessary if all the columns addressed by p are already pseudo-monochromatic c. Otherwise, one move, the move (p, c), is needed.)
  end if
  Set rule(p, 0)=cost(p, 0) and rule(p, 1)=cost(p, 1).
else
  Call COSTCOMPUTE(P', p ○ 0).

Call COSTCOMPUTE(P', p ◯ 1).
for color y∈{0,1} do
    Set cost(p, y)=min{cost(p ◯ 0, y)+cost(p ◯ 1, y), 1+cost(p ◯ 0, 1−y)+cost(p ◯ 1, 1−y)}.
    (All four cost terms have already been computed recursively by COSTCOMPUTE.)
    if cost(p, y)=1+cost(p ◯ 0, 1−y)+cost(p ◯ 1, 1−y) then
        Set rule(p, y)=1
    else
        Set rule(p, y)=0.
    end if
end for
end if
return The second recursive subroutine LISTGEN takes three arguments, the pattern P', a legal prefix p, and a color x∈{0,1}. Using values for rule, LISTGEN(P', p, x) outputs an optimal sequence of column moves to turn pseudo-monochromatic x all columns addressed by p. LISTGEN also uses a global list S, initially empty, which will be the output sequence of moves.

LISTGEN(P', p, x):
if rule(p, x)=1 then
    Append the move (p, 1−x) to S.
    if p is a pure legal prefix then
        Return (No more moves are necessary.)
    else
        Call LISTGEN(P', p ◯ 0, 1−x).
        Call LISTGEN(P', p ◯ 1, 1−x).
    end if
else
    (Now rule(p, x)=0 and there is no need for a single move with prefix p.)
    if p is a pure legal prefix then
        Return (No more moves are necessary.)
    else
        Call LISTGEN(p ◯ 0, x).
        Call LISTGEN(p ◯ 1, x).
    end if
end if
return It may be proven that the total number of recursive calls to COSTCOMPUTE and LISTGEN is bounded by w times the number of maximal pure legal prefixes, which in turn is bounded by w times the number of rules in the input ACL.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein primarily with respect to minimizing the number of rules for describing an access control list, the method of the invention may be used in any field where optimizing grid pattern descriptors is desirable, such as computer graphics and image compression. It is to be understood that the embodiments shown and described herein are only illustrative of the principles of the present invention and that various modifications may be implemented by those skilled in the art without departing from the scope and spirit of the invention.

What is claimed is:

1. A method for computing a minimum-length strip-rule access control list for a given input strip-rule pattern, the method comprising the steps of:
computing a minimum cost series of states to generate the input strip-rule pattern using a shortest-path algorithm, the algorithm repeatedly calculating successor states of a given state, and their costs, and discarding more expensive duplicate states if discovered; and
determining the minimum-length strip-rule access control list from the series of states.

2. The method of claim 1, wherein the step of determining the minimum-length strip-rule access control list comprises reversing the series of states.

3. The method of claim 1, wherein the shortest-path algorithm maintains a priority queue of calculated states, and the successor states are successor states of a lowest-cost state in the priority queue.

4. The method of claim 1, wherein a cost of a state is calculated from the number of access control list moves required to reach the state from a predecessor state plus a cost of the predecessor state.

5. The method of claim 1, wherein the shortest path algorithm comprises the steps of:
(a) initializing a priority queue with a state representing the input strip-rule pattern;
(b) in the priority queue, replacing a state of lowest cost with two new states, each of the two new states being reached by a series of moves optimally consuming one of two equivalence classes containing equivalent rows or columns, while also consuming as much as possible of the other of the two equivalence classes;
(c) for each of the new states, calculating a cost as a cost of a predecessor state of the new state plus a number of moves of step (b);
(d) if an instance of a reached state is already in the priority queue, maintaining only the lower cost instance of the state in the queue;
(e) repeating steps (b), (c) and (d) on a lowest-cost, non-final state in the priority queue until a final state is first discovered; and
(f) from the first final state reached, reversing the order of the replacing steps to determine the minimum-length access control list.

6. The method of claim 5, wherein each state in the priority queue is a five-tuple comprising:
(a) an identity E1 of a newer one of the equivalence classes;
(b) a color c1 of the two colors contained in cells of equivalence class E1;
(c) an identity E2 of the older one of the equivalence classes;
(d) a color c2 of the two colors contained in cells of equivalence class E2; and
(e) a subset U of lines of E2 containing at least one cell of color c2.

7. The method of claim 5, wherein the step of replacing the state with two new states, each of the two new states being reached by a series of moves optimally consuming one of two equivalence classes containing equivalent rows or columns, while also consuming as much as possible of the other of the two equivalence classes, further comprises the step of:
(a) for each contiguous set of strips defined by a shortest possible common binary prefix of binary representations of locations of the strips, each strip in the contiguous set containing only one of two colors, determining a minimum-length series of steps to cover all uncovered cells of one of the two colors, each step comprising covering one or more contiguous strips of cells containing uncovered cells of only a single color.

8. The method of claim 1, wherein the shortest-path algorithm comprises the steps of:
(a) initializing a priority queue with a five-tuple representing the input strip rule pattern, wherein elements of the five-tuple define two active equivalence classes of strips in the input pattern, each one of the active equivalence classes containing one or more strips of cells, each one of the two active equivalence classes containing only strips having cells arranged in a same color pattern in the input pattern as other strips in the equivalence class and containing cells of only one of two colors of the input pattern;
(b) for each of two active equivalence classes, perform the following:
   (i) determining a minimum-length series of steps to cover all uncovered cells of the active equivalence class, each step comprising covering one or more contiguous strips of cells containing uncovered cells of only a single color;
   (ii) determining a cost associated with a state resulting from the series of steps, the cost being a number of moves to reach the resulting state from a predecessor state plus the cost of that predecessor state, and, if the resulting state is non-final,
   (iii) defining a new five-tuple representing the resulting state;
   (iv) adding the new five-tuple, together with the resulting cost, to the priority queue;
   (v) eliminating duplicate states in the priority queue by retaining only that instance of the state having a lower cost;
(c) repeating step (b) on a lowest-cost non-final state in the priority queue, until a final state is first reached; and
(d) when a final state is reached, constructing the access control list by reversing an order of the stored steps of the state.

9. The method of claim 8, wherein the priority queue additionally contains, for each state of the grid, a definition of a predecessor state in association with each state.

10. The method of claim 8, wherein the priority queue additionally contains, for each state of the grid, a series of steps to create the state from its predecessor state.

11. The method of claim 8 wherein, if the minimum-length series of steps that covers all uncovered cells of one active equivalence class also covers all uncovered cells of the other active equivalence class, step (b) is not repeated for the other active equivalence class.

12. The method of claim 8, wherein the step determining a minimum-length series of steps to cover all uncovered cells of the active equivalence class further comprises the step of:
(a) for each contiguous set of strips defined by a shortest possible common binary prefix of binary representations of locations of the strips, each strip in the contiguous set containing only one of the two colors, determining a minimum-length series of steps to cover all uncovered cells of one of the two colors, each step comprising covering one or more contiguous strips of cells containing uncovered cells of only a single color.

13. The method of claim 8, wherein the five-tuple comprises:
(a) an identity E1 of a newer one of the equivalence classes;
(b) a color c1 of the two colors contained in cells of equivalence class E1;
(c) an identity E2 of an older one of the equivalence classes;
(d) a color c2 of the two colors contained in cells of equivalence class E2; and
(e) a subset U of lines of E2 containing at least one cell of color c2.

14. A method for computing a minimum-length strip-rule rectangle rule list for a given input strip-rule pattern, the method comprising the steps of:

computing a minimum cost series of states to generate the input strip-rule pattern using a shortest-path algorithm, the algorithm repeatedly calculating successor states of a given state, and their costs, and discarding more expensive duplicate states if discovered; and
determining the minimum-length strip-rule rectangle rule list from the series of states.

15. The method of claim 14, wherein the shortest-path algorithm maintains a priority queue of calculated states, and the successor states are successor states of a lowest-cost state in the priority queue.

16. The method of claim 14, wherein a cost of a state is calculated as a cost of its predecessor state plus a number of moves needed to get to the state from the predecessor state.

17. The method of claim 14, wherein the shortest path algorithm comprises the steps of:
(a) initializing a priority queue with a state representing the input strip-rule pattern;
(b) in the priority queue, replacing the state with two new states, each of the two new states being reached by a series of moves optimally consuming one of two equivalence classes containing equivalent rows or columns, while also consuming as much as possible of the other of the two equivalence classes;
(c) for each of the new states, calculating a cost as a cost of a predecessor state of the new state plus a number of moves of step (b);
(d) if an instance of a reached state is already in the priority queue, maintaining only the lower cost instance of the state in the queue; and
(e) repeating steps (b), (c) and (d) on a lowest-cost, non-final state in the priority queue until a final state is first reached.

18. The method of claim 17, wherein each state in the priority queue is a five-tuple comprising:
(a) an identity E1 of a newer one of the equivalence classes;
(b) a color c1 contained in cells of equivalence class E1;
(c) an identity E2 of the older one of the equivalence classes;
(d) a color c2 contained in cells of equivalence class E2; and
(e) a subset U of lines of E2 containing at least one cell of color c2.

19. The method of claim 14, wherein the shortest-path algorithm comprises the steps of:
(a) initializing a priority queue with a five-tuple representing the input strip rule pattern, wherein elements of the five-tuple define two active equivalence classes of strips in the input pattern, each one of the active equivalence classes containing one or more strips of cells, each one of the two active equivalence classes containing only strips having cells arranged in the same color pattern in the input pattern as other strips in the equivalence class and containing cells of only one of two colors of the input pattern;
(b) for each of two active equivalence classes, perform the following:
   (i) determining a minimum-length series of steps to cover all uncovered cells of the active equivalence class and covering as many lines of the other equivalence class as possible, each step comprising covering one or more contiguous strips of cells containing uncovered cells of only a single color;
   (ii) determining a cost associated with a state resulting from the series of steps, the cost being a number of moves to reach the resulting state from a predecessor state plus the cost of that predecessor state, and, if the resulting state is non-final;

(iii) defining a new five-tuple representing the resulting state;

(iv) adding the new five-tuple, together with the resulting cost, to the priority queue;

(v) eliminating duplicate states in the priority queue by retaining only that instance of the state having a lower cost; and (c) repeating step (b) on a lowest-cost non-final state in the priority queue, until a final state is first reached.

20. The method of claim 19, wherein the priority queue additionally contains, for each state of the grid, a definition of a predecessor state in association with each state.

21. The method of claim 19, wherein the priority queue additionally contains, for each state of the grid, a series of steps to create the state from its predecessor state.

22. The method of claim 19 wherein, if the minimum-length series of steps that covers all uncovered cells of one active equivalence class also covers all uncovered cells of the other active equivalence class, step (b) is not repeated for the other active equivalence class.

23. The method of claim 19 wherein the step determining a minimum-length series of steps to cover all uncovered cells of the active equivalence class further comprises the steps of:

(a) creating one step to cover each embedded block of lines; and (b) creating one step to cover each enclosing block of lines.

24. The method of claim 19, wherein the five-tuple comprises:

(a) an identity E1 of a newer one of the equivalence classes;

(b) a color c1 of the two colors contained in cells of equivalence class E1;

(c) an identity E2 of an older one of the equivalence classes;

(d) a color c2 of the two colors contained in cells of equivalence class E2; and (e) a subset U of lines of E2 containing at least one cell of color c2.

* * * * *